Figure 1:
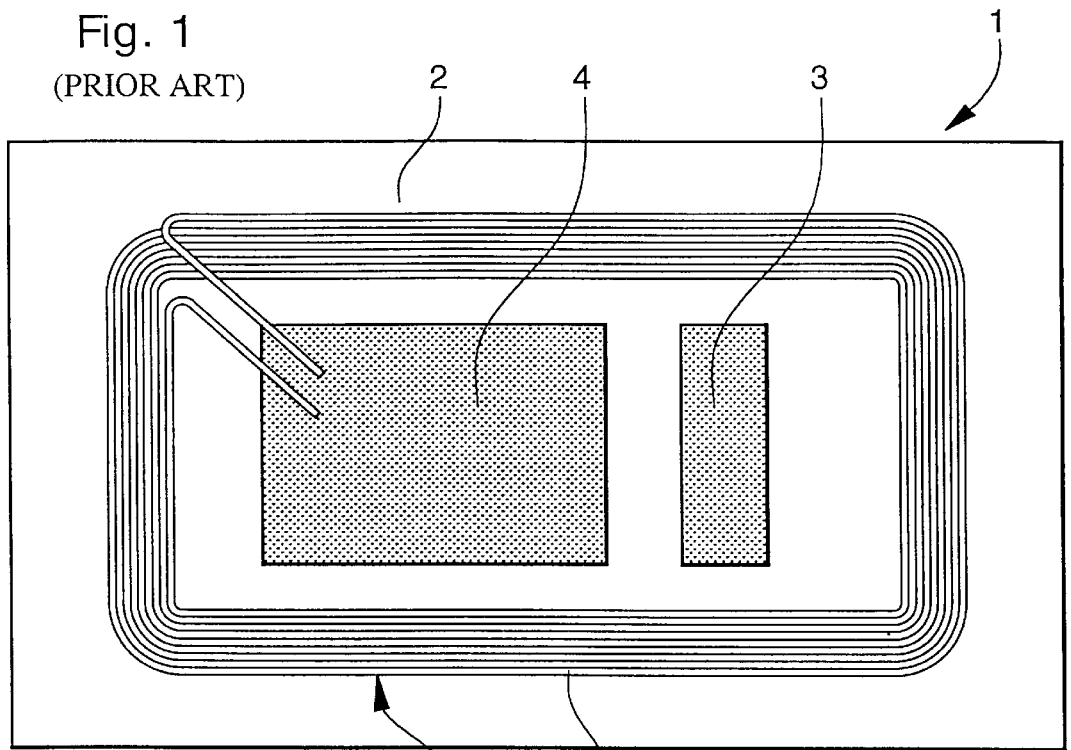

United States Patent
Kunz

[11] Patent Number: 6,127,989
[45] Date of Patent: *Oct. 3, 2000

[54] MONOLITHIC INTEGRATED CIRCUIT AND ANTENNA COIL STRUCTURE COMPRISING A PERIPHERAL PROTECTIVE RING

[75] Inventor: Pascal Kunz, Neuchâtel, Switzerland

[73] Assignee: EM Microelectronic-Marin SA, Marin, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 09/037,715

[22] Filed: Mar. 10, 1998

[30]    Foreign Application Priority Data

Mar. 24, 1997 [CH] Switzerland ............................. 0702/97

[51] Int. Cl.[7] ............................. G06K 19/07; H01Q 1/32
[52] U.S. Cl. .................................. 343/895; 343/700 MS; 235/449; 235/493
[58] Field of Search ......................... 235/449; 340/572; 343/700 MS, 895, 702, 732, 833, 837, 842, 867, 870, 878

[56]              References Cited

U.S. PATENT DOCUMENTS

| | | | |
|---|---|---|---|
| 4,237,438 | 12/1980 | McCoy | 335/214 |
| 4,724,427 | 2/1988 | Carroll | 340/572 |
| 4,999,742 | 3/1991 | Stampfli | 361/400 |
| 5,198,647 | 3/1993 | Mizuta | 235/449 |
| 5,565,876 | 10/1996 | Murakami et al. | 343/713 |

FOREIGN PATENT DOCUMENTS

| | | |
|---|---|---|
| 2 101 412 | 1/1983 | United Kingdom . |
| WO 88/00785 | 1/1988 | WIPO . |

*Primary Examiner*—Don Wong
*Assistant Examiner*—James Clinger
*Attorney, Agent, or Firm*—Griffin & Szipl, P.C.

[57]              ABSTRACT

The present invention concerns an integrated circuit structure (1) formed in a substrate (2) and including at least one integrated circuit element (3, 4), an antenna coil (5) capable of transmitting and/or receiving data, and associated with said integrated circuit element(s) (3, 4); and a metal protective ring (20) situated at the periphery of the integrated circuit structure (1). The present invention is characterised in that said protective ring (20) comprises at least one ohmic interruption, so that it does not form a closed circuit on itself. The integrated circuit structure (1) according to the invention is improved in that the operation of the antenna coil (5) is made insensitive to the presence of the protective ring (20).

7 Claims, 1 Drawing Sheet

U.S. Patent

Oct. 3, 2000

6,127,989

MONOLITHIC INTEGRATED CIRCUIT AND ANTENNA COIL STRUCTURE COMPRISING A PERIPHERAL PROTECTIVE RING

The present invention concerns a monolithic integrated circuit structure and, more particularly, a monolithic structure essentially including an antenna coil provided with a peripheral protective ring.

Structures including integrated circuits and an antenna coil are conventionally used, in particular for making a transceiver which is generally called a "transponder". By way of example, and as shown in FIG. 1, WO 88/00785 discloses a transponder device including a monolithic structure 1 formed in a substrate 2, and comprising different integrated circuits 3, 4 and an antenna coil 5, as is shown in FIG. 1 by way of illustrative example. In this example, coil 5 is formed by several conductive turns 6 which surround different logic circuits 3, 4.

According to the present invention, during manufacturing of the mask intended to make the structures of the aforementioned type, a metal protective ring 8 is formed at the periphery of structure 1. A protective ring of this type usually has numerous advantages in that it protects structure 1 against mechanical stress exerted on the different layers deposited on substrate 2 during dicing of the integrated circuits formed on substrate 2, in that it allows a high quality finish of the edges of the integrated circuits, and in that it avoids corrosion of integrated circuit elements 3, 4 and 5.

However, the Applicant has observed that, in such structures, the metal protective ring forms what may be called a parasitic short-circuit turn for the elements situated within said turn, in particular the antenna coil. Essentially, this parasitic turn surrounding the antenna coil affects in particular the action of external fields intended essentially for said coil, which causes undesirable disturbances in the operation thereof.

It goes without saying that an integrated circuit structure in which the coil does not necessarily surround all the integrated circuit elements, has the same malfunction.

An object of the present invention is to provide an improved integrated circuit structure including in particular an antenna coil and a peripheral protective ring, in order to avoid disturbed operation of said coil.

This object, in addition to others, are achieved by the improved integrated circuit structure formed in a substrate and including:

at least one integrated circuit element;

an antenna arranged to receive data and energy to supply the integrated circuit element; and a metal protective ring situated at the periphery of said integrated circuit structure to protect elements of said integrated circuit against mechanical stress or corrosion; said structure being characterised in that said protective ring includes at least one ohmic interruption, so that it does not form a closed circuit on itself, in order that the antenna coil is insensitive to the presence of the protective ring thereby enabling operation of said integrated circuit structure.

An advantage of the present invention is to provide such a structure fitted with a non-continuous peripheral protective ring all the way along the periphery of said structure, which avoids said ring forming a peripheral closed circuit.

Figure 2:
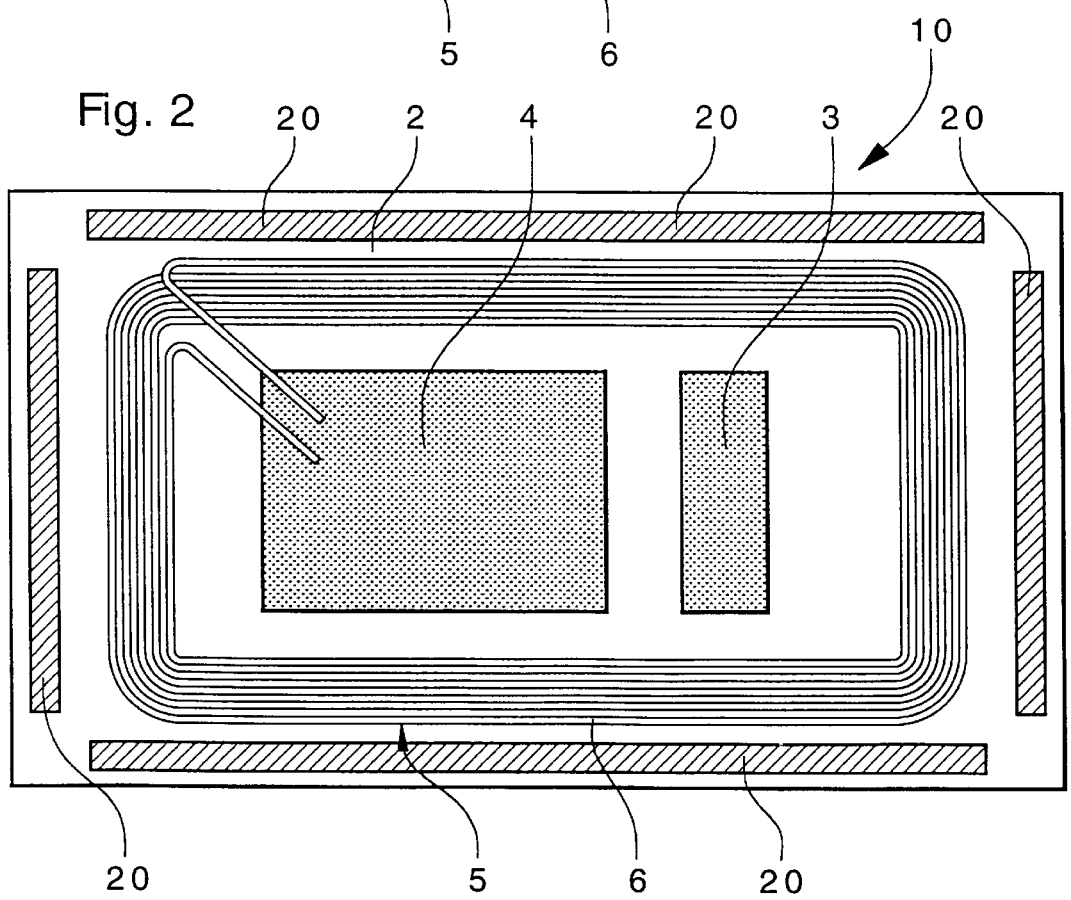

The objects, features and advantages of the present invention, will appear more clearly upon reading the detailed description of a preferred embodiment of the invention, given solely by way of example, in relation to the annexed drawings, in which:

FIG. 1, already cited, shows an integrated circuit and antenna coil structure according to the prior art; and FIG. 2 shows an integrated circuit structure surrounded by an antenna coil and a protective ring according to the invention.

An integrated circuit structure 10 shown in FIG. 2 is close to the integrated circuit structure described hereinbefore. For the sake of simplicity, the components shown in FIG. 2 and designated by the same references as those shown in FIG. 1 are substantially identical to those designated in FIG. 1.

Integrated circuit structure 10 formed in a monolithic manner in a substrate 2 consists of various integrated circuit elements 3, 4 and an antenna coil 5 formed by several conductive turns 6 which surround, in this example, the various logic circuit elements 3, 4.

Integrated circuit structure 10 further includes a protective ring 20 formed at the periphery of integrated circuit structure 10, by manufacturing methods commonly known to the man skilled in the art. Protective ring 20 is designed so that it does not form a circuit closed on itself. Protective ring 20 is therefore provided with ohmic interruptions. It goes without saying that the four ohmic interruptions of protective ring 20 are only shown by way of illustration in FIG. 2.

By way of alternative, other embodiments of protective ring 20 may be provided. For example, the shape of the protective ring may be modified according to the shape of the integrated circuit structure at the periphery of which the protective ring is formed.

The fact of locally cutting metal protective ring 20 by at least one ohmic interruption of protective ring 20 thus avoids formation of a parasitic short-circuit turn as described hereinbefore, which makes the operation of antenna 5 insensitive to the presence of protective ring 20.

It goes without saying for the man skilled in the art that the detailed description hereinbefore may undergo various modifications without departing from the scope of the present invention.

What is claimed is:

1. An integrated circuit structure formed in a semiconductor substrate and including:

at least one electronic integrated circuit element;

an antenna coil arranged to receive data and energy to supply said electronic integrated circuit element; and a metal protective ring situated at the periphery of said electronic integrated circuit structure to protect elements of said electronic integrated circuit structure from mechanical stress or corrosion;

wherein said protective ring is arranged with at least one ohmic interruption, so that it does not form a closed circuit on itself, in order that the antenna coil is insensitive to the presence of the protective ring, thereby enabling operation of said electronic integrated circuit element.

2. The integrated circuit structure of claim 1, wherein said antenna coil and said electronic integrated circuit element together define a transponder.

3. The integrated circuit structure of claim 1, wherein said protective ring is arranged with four ohmic interruptions.

4. A method for manufacturing an integrated circuit structure formed in a semiconductor substrate, said method comprising the steps:

manufacturing at least one electronic integrated circuit element in a semiconductor substrate;

manufacturing an antenna coil arranged to receive data and energy to supply said electronic integrated circuit element; and manufacturing a metal protective ring situated at the periphery of said integrated circuit structure, said protective ring being arranged with at least one ohmic interruption, so that it does not form a closed circuit on itself, in order that the antenna coil is insensitive to the presence of the protective ring, thereby enabling operation of said integrated circuit structure.

5. The method of claim 4, wherein said protective ring is arranged with four ohmic interruptions.

6. A method for manufacturing an integrated circuit structure formed in a semiconductor substrate, said method comprising the steps:

manufacturing at least one electronic integrated circuit element in a semiconductor substrate;

manufacturing an antenna coil arranged to receive data and energy to supply said electronic integrated circuit element; and manufacturing a metal protective ring situated at the periphery of said integrated circuit structure to protect elements of said integrated circuit structure against mechanical stress or corrosion, said protective ring being arranged with at least one ohmic interruption, so that it does not form a closed circuit on itself, in order that the antenna coil is insensitive to the presence of the protective ring, thereby enabling operation of said integrated circuit structure.

7. The method of claim 6, wherein said protective ring is arranged with four ohmic interruptions.

* * * * *